（12） United States Patent
Lee

(10) Patent No.: US 9,509,206 B2
(45) Date of Patent: Nov. 29, 2016

(54) POWER FACTOR CORRECTOR CORRECTING A POWER FACTOR OF AN ALTERNATING CURRENT (AC) VOLTAGE

(71) Applicant: LSIS CO., LTD., Anyang-si, Gyeonggi-do (KR)

(72) Inventor: Jae Ho Lee, Bucheon-si (KR)

(73) Assignee: LSIS CO., LTD., Anyang-si (KR)

( * ) Notice: Subject to any disclaimer, the term of this patent is extended or adjusted under 35 U.S.C. 154(b) by 231 days.

(21) Appl. No.: 14/338,112

(22) Filed: Jul. 22, 2014

(65) Prior Publication Data

US 2015/0061608 A1    Mar. 5, 2015

(30) Foreign Application Priority Data

Sep. 2, 2013 (KR) .................. 10-2013-0104936

(51) Int. Cl.
 *H02M 1/14* (2006.01)
 *H02M 1/42* (2007.01)
 *H02M 1/12* (2006.01)

(52) U.S. Cl.
 CPC .............. *H02M 1/14* (2013.01); *H02M 1/126* (2013.01); *H02M 1/4225* (2013.01); *H02M 1/4208* (2013.01); *Y02B 70/126* (2013.01)

(58) Field of Classification Search
 CPC ...... H02M 1/14; H02M 1/42; H02M 1/4208; H02M 1/4225; H02M 3/155; H02M 1/44
 See application file for complete search history.

(56) References Cited

U.S. PATENT DOCUMENTS

| | | | | |
|---|---|---|---|---|
| 4,673,851 | A * | 6/1987 | Disser | H02M 1/14 318/599 |
| 5,825,639 | A * | 10/1998 | Wagoner | H02M 1/14 363/39 |
| 2007/0236968 | A1 * | 10/2007 | Wu | H02M 1/14 363/39 |
| 2009/0010029 | A1 * | 1/2009 | Mizukoshi | H02M 7/003 363/40 |
| 2010/0066325 | A1 * | 3/2010 | Shionoiri | G06K 19/0701 323/282 |

(Continued)

FOREIGN PATENT DOCUMENTS

CN    201336630    10/2009
CN    103051039    4/2013

(Continued)

OTHER PUBLICATIONS

Korean Intellectual Property Office Application Serial No. 10-2013-0104936, Notice of Allowance dated Sep. 17, 2014, 2 pages.

(Continued)

*Primary Examiner* — Fred E Finch, III
(74) *Attorney, Agent, or Firm* — Lee Hong Degerman Kang & Waimey

(57) ABSTRACT

A power factor corrector correcting the power factor of an alternating current (AC) voltage is disclosed. A power factor correcting unit corrects the power factor of the AC voltage. A smoothing unit smoothes a power factor corrected voltage and includes a film condenser and a plurality of electrolytic condensers. A rectified voltage is applied to one end of an inductor. One end of a switch is connected to the other end of the inductor, and the other end of the switch is earthed. One end of a diode is connected to one end of the switch. One end of a film condenser is connected to the other end of the diode, and the other end of the film condenser is earthed. An electrolytic condenser is parallel-connected to the film condenser.

13 Claims, 10 Drawing Sheets

(56) References Cited

U.S. PATENT DOCUMENTS

| | | | | |
|---|---|---|---|---|
| 2012/0249091 | A1* | 10/2012 | Chen | H02M 1/4225 323/207 |
| 2013/0208518 | A1* | 8/2013 | Kinoshita | H02M 1/14 363/40 |
| 2013/0322137 | A1* | 12/2013 | Lee | H02M 7/217 363/45 |
| 2014/0369077 | A1* | 12/2014 | Chun | H02M 1/4225 363/17 |

FOREIGN PATENT DOCUMENTS

| | | |
|---|---|---|
| CN | 103227496 | 7/2013 |
| JP | 06-039270 | 5/1994 |
| JP | 10-295081 | 11/1998 |
| JP | 2000-209869 | 7/2000 |
| JP | 2002-542757 | 12/2002 |
| JP | 2005-101280 | 4/2005 |
| JP | 2005-253228 | 9/2005 |
| JP | 2011-030310 | 2/2011 |
| KR | 10-2002-0006436 | 1/2002 |
| KR | 10-2011-0005337 | 1/2011 |
| WO | 2012/043466 | 4/2012 |
| WO | 2013/120768 | 8/2013 |

OTHER PUBLICATIONS

Japan Patent Office Application Serial No. 2014-177302, Office Action dated Aug. 25, 2015, 3 pages.

The State Intellectual Property Office of the People's Republic of China Application Serial No. 201410443953.5, Office Action dated Jun. 15, 2016, 8 pages.

* cited by examiner

POWER FACTOR CORRECTOR CORRECTING A POWER FACTOR OF AN ALTERNATING CURRENT (AC) VOLTAGE

CROSS-REFERENCE TO RELATED APPLICATIONS

Pursuant to 35 U.S.C. §119(a), this application claims the benefit of earlier filing date and right of priority to Korean Patent Application No. 10-2013-0104936, filed on Sep. 2, 2013, the contents of which are all hereby incorporated by reference herein in its entirety.

BACKGROUND

The present disclosure relates to a power factor corrector, and more particularly, to a circuit that may decrease a ripple current flowing in a capacitor, extend the lifetime of a capacitor and eventually extend the lifetime of a power factor corrector.

Since in the case of an alternating circuit, the phases of a voltage and a current are not necessarily the same, the product of the voltage and the current does not become power that may be actually used. A ratio of the product of the voltage and the current to effective power that may be actually used is referred to as a power factor. When the power factor is small, there is a loss in transmission power and thus a power factor corrector for preventing it is being widely used in various electronics. Also, many countries demand to install such a power factor corrector.

A charging device for charging a battery for an electric vehicle also needs a power factor corrector. In this case, since the output capacitor of a power factor corrector in the charging device has to smooth ripple power corresponding to two times an input power frequency, a capacitor having a large capacitance should be used. Thus, an electrolytic condenser is mainly used.

In general, the followings are considered in designing the output capacitor of a power factor corrector: firstly, a hold-up time at which output power is maintained even while an AC voltage is not supplied, secondly, a ripple current, and thirdly, the magnitude of a circuit. In general, since in the case of consumer electronics, output power is less than or equal to 500 W and their operations should be ensured even when there is instantaneous interruption, the capacitance of a capacitor is designed to be sufficiently large in consideration of the hold-up time. Thus, the ripple current is not an important consideration in design. However, in the case of an electric vehicle, it is general that there is no requirement for the hold-up time, and the magnitude and lifetime of a circuit are importantly considered. Thus, when designing a power factor corrector used in a charging device for an electric vehicle, the ripple current and the lifetime of a capacitor are top considerations.

SUMMARY

Embodiments provide a circuit that may extend the lifetime of a power factor corrector when a large power factor corrector is needed, such as in the case of a charging device for an electric vehicle.

In one embodiment, a power factor corrector correcting a power factor of an alternating current (AC) voltage includes a power factor correcting unit correcting a power factor of an AC voltage; and a smoothing unit smoothing a power factor corrected voltage, wherein the smoothing unit includes a film condenser and a plurality of electrolytic condensers.

The plurality of electrolytic condensers may have a same capacitance.

The plurality of electrolytic condensers may be parallel-connected.

The plurality of electrolytic condensers may have a limit ripple current that is determined based on a number of the plurality of electrolytic condensers.

The plurality of electrolytic condensers may have a limit ripple current that is determined based on a capacitance tolerance of the plurality of electrolytic condensers.

The power factor correcting unit may be a boost converter that includes a switch.

A capacitance of the film condenser may be determined by a switching frequency of the switch.

A capacitance of the film condenser may be determined by a value of a parasitic resistance of the plurality of electrolytic condensers.

In another embodiment, a power factor corrector correcting a power factor of an AC voltage includes an inductor to one end of which a rectified voltage is applied; a switch, wherein one end of the switch is connected to the other end of the inductor, and the other end of the switch is earthed; a diode, wherein one end of the diode is connected to one end of the switch; a film condenser, wherein one end of the film condenser is connected to the other end of the diode, and the other end of the film condenser is earthed; and a plurality of electrolytic condensers parallel-connected to the film condenser.

In further another embodiment, a method of operating a power factor corrector correcting a power factor of an AC voltage includes correcting a power factor of an AC voltage; and smoothing a power factor corrected voltage by using a film condenser and a plurality of electrolytic condensers.

The plurality of electrolytic condensers may have a same capacitance and may have a limit ripple current that is determined based on a number of the plurality of electrolytic condensers or based on a capacitance tolerance of the plurality of electrolytic condensers.

Embodiments provide a power factor corrector that has a longer lifetime than a typical power factor corrector by decreasing a ripple current flowing through a capacitor as compared to the typical power factor corrector.

DETAILED DESCRIPTION OF THE EMBODIMENTS

Figure 1:
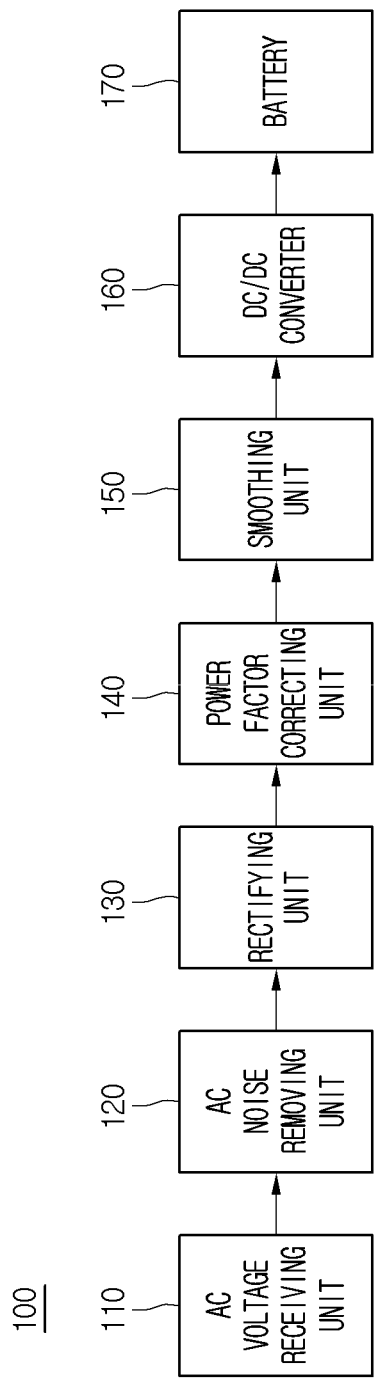
FIG. 1 is a block diagram of a power factor corrector according to an embodiment.

Embodiments of the present invention are described below in detail with reference to the accompanying drawings so that a person skill in the art may easily practice the present invention. However, the present invention may be implemented in several different forms and is not limited to embodiments that are described herein. In addition, parts having no impact on descriptions are dropped in the drawings in order to make the present invention clear and similar parts throughout the disclosure have similar reference numerals.

Also, when it is described that one comprises (or includes or has) some elements, it should be understood that it may comprise (or include or has) only those elements, or it may comprise (or include or have) other elements as well as those elements if there is no specific limitation.

A power factor corrector and a designing method according to embodiments are described below with reference to FIGS. 1 to 5.

FIG. 1 is a block diagram of a power factor corrector according to an embodiment of the present invention.

Referring to FIG. 1, a power factor corrector 100 may include an alternating current (AC) voltage receiving unit 110, an AC noise removing unit 120, a rectifying unit 130, a power factor correcting unit 140, a smoothing unit 150, a direct current (DC)/DC converter 160, and a battery 170.

The power factor correcting unit 140 corrects a power factor.

The DC/DC converter 160 converts a smoothed voltage to a voltage necessary for charging.

The battery 170 is charged with the converted voltage.

Other components of the power factor corrector 100 are described in detail with reference to FIG. 2. Other components of the power factor corrector 100 are described in detail with reference to FIG. 2.

Figure 2:
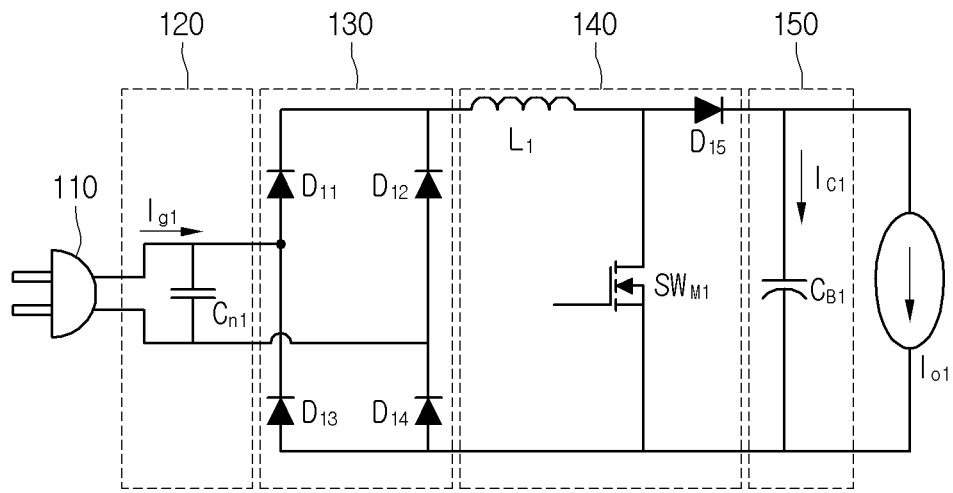
FIG. 2 is a circuit diagram of a power factor corrector according to an embodiment.

FIG. 2 is a circuit diagram of a power factor corrector according to an embodiment.

The AC voltage receiving unit 110 receives an AC voltage. Current $I_{g1}$ means an AC current that the AC voltage receiving unit 110 receives.

The AC noise removing unit 120 includes a capacitor $C_{n1}$. One end of the capacitor $C_{n1}$ is connected to one end of the AC voltage receiving unit 110 to which an AC voltage is applied, and the other end of the capacitor $C_{n1}$ is connected to the other end of the AC voltage receiving unit 110.

The rectifying unit 130 may include a plurality of diodes. The embodiment of FIG. 2 includes four diodes. The four diodes are bridge-connected. One end of the lower left diode $D_{13}$ of the bridge-connected four diodes is connected to the other end of the capacitor $C_{n1}$ of the AC noise removing unit 120 and the other end of the diode $D_{13}$ is earthed. One end of the lower right diode $D_{14}$ of the bridge-connected four diodes is connected to one end of the capacitor $C_{n1}$ of the AC noise removing unit 120 and the other end of the diode $D_{14}$ is earthed. One end of the upper left diode $D_{11}$ of the bridge-connected four diodes is connected to the other end of the capacitor $C_{n1}$ of the AC noise removing unit 120 and the other end of the diode $D_{11}$ is connected to one end of the lower left diode $D_{13}$. One end of the lower right diode $D_{12}$ of the bridge-connected four diodes is connected to the other end of the upper left diode $D_{11}$ and the other end of the diode $D_{12}$ is connected to one end of the lower right diode $D_{14}$. The rectifying unit 140 rectifies noise-removed AC voltages so that they have the same polarity, and outputs the rectified voltages.

The power factor correcting unit 140 may be, in particular, a boost converter. The boost converter includes an inductor $L_1$, a MOSFET switch $SW_{M1}$, and a diode $D_{15}$. One end of the inductor $L_1$ is connected to one end of the upper right diode $D_{12}$ of the rectifying unit 130. One end of the MOSFET switch $SW_{M1}$ is connected to the other end of the inductor $L_1$ and the other end of the MOSFET switch $SW_{M1}$ is earthed. One end of the diode $D_{15}$ is connected to the other end of the inductor $L_1$. The boost converter repeats switching to make the phase of a current equal to the phase of a voltage while keeping the magnitude of the rectified voltage constant. That is, the flow of the current is adjusted by using a method of making the current flow for a certain time and then blocking the current for a certain time. By adjusting the flow of the current in this method, the phase of the voltage becomes equal to the phase of the current and thus a power factor is corrected.

The smoothing unit includes a capacitor. In particular, the capacitor may be an electrolytic condenser $C_{B1}$. One end of the electrolytic condenser $C_{B1}$ is connected to the other end of the diode $D_{15}$ and the other end of the electrolytic condenser $C_{B1}$ is earthed. Current $I_{C1}$ means a current input to the electrolytic condenser $C_{B1}$. Current $I_{O1}$ means the total output current of the power factor corrector 100. The smoothing unit 150 removes ripple from a power factor corrected voltage and generates a DC voltage. That is, the smoothing unit 150 smoothes the power factor corrected voltage.

Figure 3:
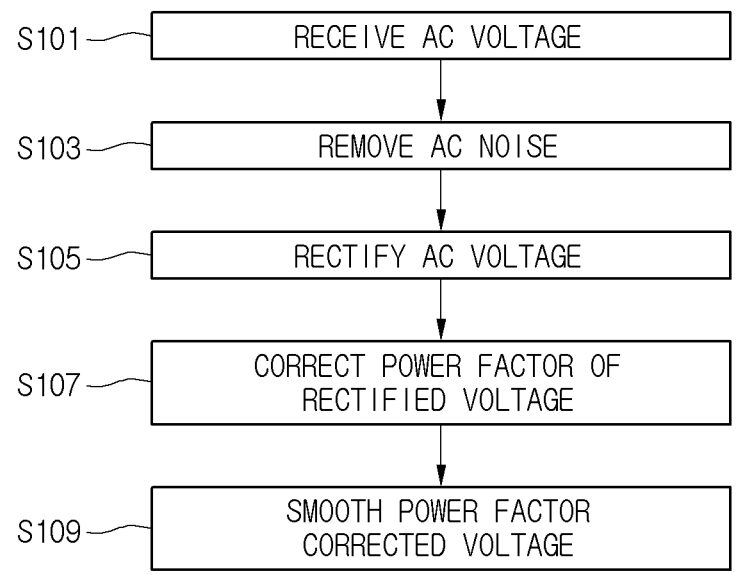
FIG. 3 is a flow chart showing the operations of a power factor corrector according to an embodiment.

FIG. 3 is a flow chart showing the operations of a power factor corrector according to an embodiment.

The AC voltage receiving unit 110 receives an AC voltage in step S101.

The AC noise removing unit 120 removes noise from the received AC voltage in step S103.

The rectifying unit 130 rectifies noise-removed AC voltages so that they have the same polarity, and outputs rectified power, in step S105.

The power factor correcting unit 140 corrects the power factor of the rectified voltage and outputs a power factor corrected voltage in step S107.

The smoothing unit 150 smoothes the power factor corrected voltage, in step S109. That is, the ripple current of the power factor corrected power is removed and a DC current is output.

Figure 4:
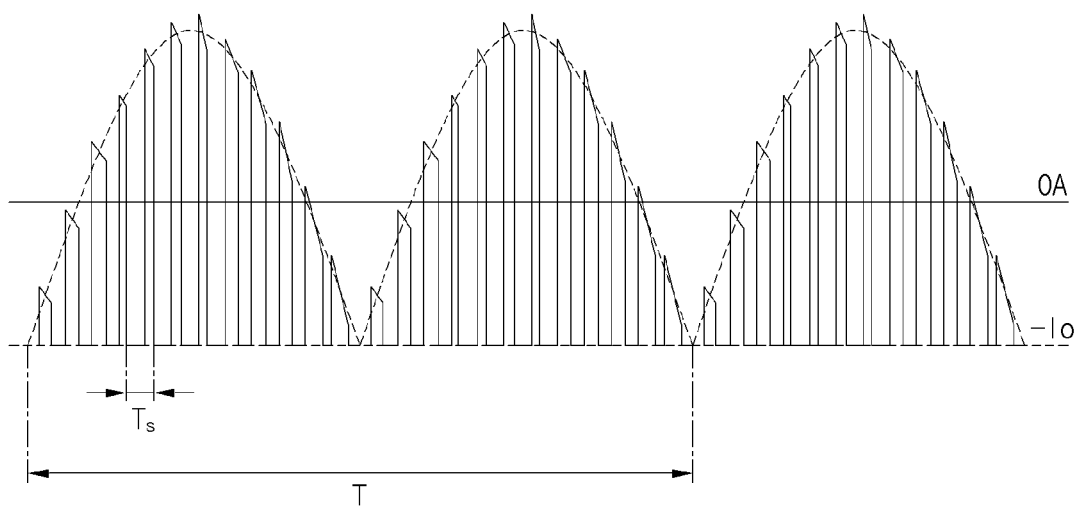
FIG. 4 shows a ripple current input to a smooth circuit when operating a power factor corrector according to an embodiment.

FIG. 4 shows a ripple current input to a smoothing circuit when operating a power factor corrector according to an embodiment.

Although this current is rectified by the rectifying unit 130, it may be seen that the current has a pulse wave shape because it is not smoothed by the smoothing unit 150. Since an input current is rectified by the rectifying unit 130, there is a low frequency corresponding to fundamentally two times an input frequency (120 Hz when the input frequency is 60 Hz). Also, it may be seen that when the power factor correcting unit 140 is a boost converter, there may be a switching frequency by the switching of the boost converter.

Figure 5:
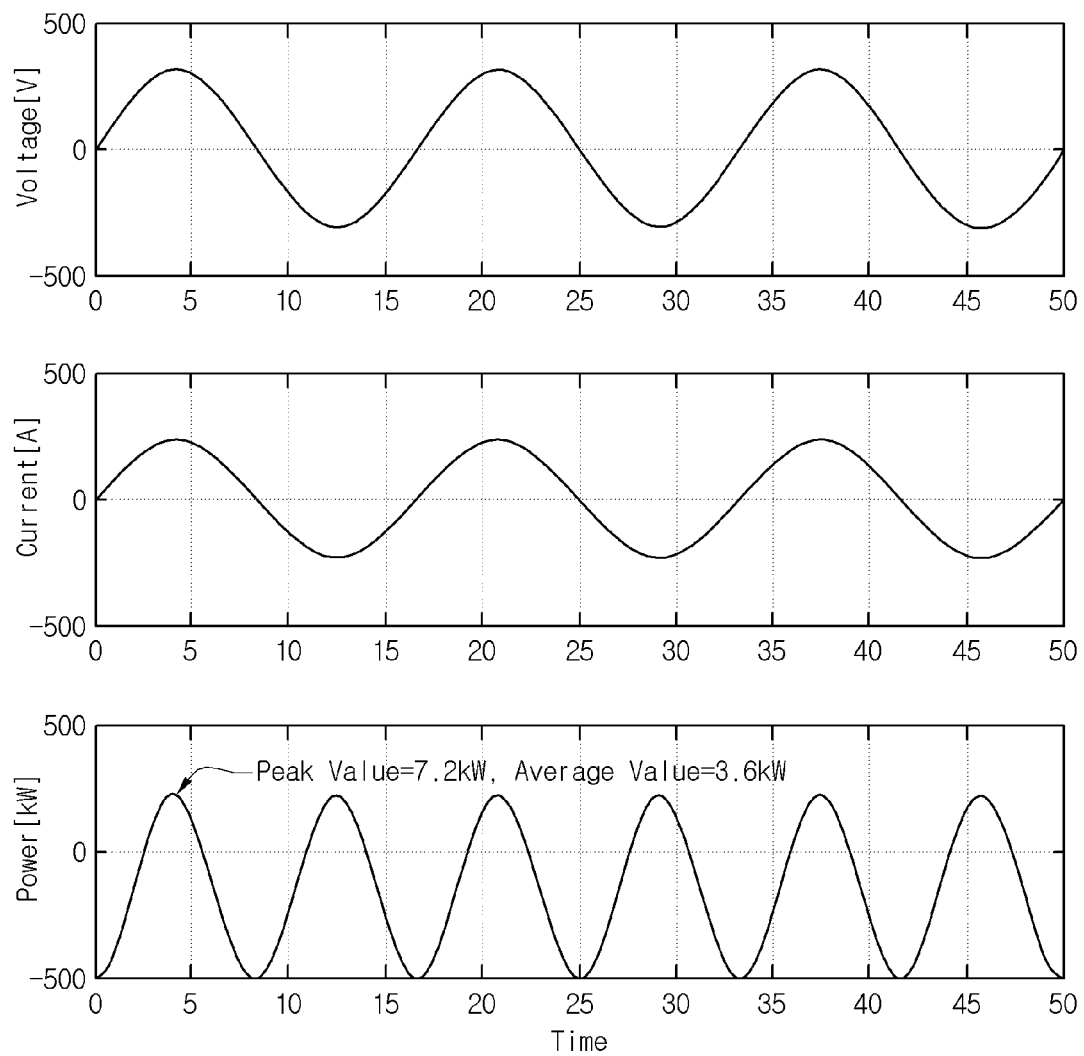
FIG. 5 shows the input voltage, input current, and output power of a power factor corrector according to an embodiment.

FIG. 5 shows the input voltage, input current, and output power of a power factor corrector according to an embodiment.

As can be seen in FIG. 5, since the power factor corrector 100 controls an input current to have the same phase as an input voltage, output power has ripple power corresponding to two times output power while having two times an input frequency. Thus, to smooth it, a capacitor configuring the smoothing unit 150 of the power factor corrector 100 should use a capacitor having a significantly large capacitance. Thus, an electrolytic condenser that has a large capacitance as compared to its size is generally used.

When it is assumed that the power factors of the input current and the input voltage is '1' and the efficiency of a system approaches 100%, the RMS value of a ripple current flowing in the electrolytic condenser $C_{B1}$ may be found as follows:

$$I_{c1} = \sqrt{\frac{8\sqrt{2}}{3\pi} I_{g1} I_{o1} - I_{o1}^2}$$

When an input is 220 V, the RMS value of a ripple current of the capacitor of a 3.6 kW charger is found as follows by using the expression above:

$$I_{c1} = \sqrt{\frac{8\sqrt{2}}{3\pi} I_{g1} I_{o1} - I_{o1}^2} = \sqrt{\frac{8\sqrt{2}}{3\pi} 16.36 \times 9 - 9^2} = 9.79$$

(unit $A_{RMS}$).

From the result above, it may be seen that an electrolytic condenser tolerating an allowable ripple current equal to or greater than at least 9.8 $A_{RMS}$ should be used.

When the frequency of an AC voltage is 60 Hz, a ripple current generated by the AC voltage has a frequency of 120 Hz as described with respect to FIG. 2. In this case, when the ripple current is referred to as $I_{C1:120Hz}$, and a ripple current corresponding to a switching frequency is referred to as $I_{C1:SW}$, the following expression is obtained:

$$I_{c1} = \sqrt{I_{C1:120Hz}^2 - I_{C1:SW}^2}$$

The current $I_{C1:120Hz}$ may be found as follows:

$$I_{c1:120Hz} = \sqrt{\frac{1}{T} \int_0^T I_{c1}^2 dt} = \frac{I_o}{\sqrt{2}} = 6.36$$

(unit $A_{RMS}$).

Thus, the current $I_{C1:SW}$ is as follows:

$$I_{c1:SW} = \sqrt{I_{c1}^2 - I_{c1:120Hz}^2} = \sqrt{9.79^2 - 6.36^2} = 7.44$$

(unit: $A_{RMS}$).

That is, the current $I_{C1:SW}$ has a magnitude of 7.44 $A_{RMS}$.

In the following, a power factor corrector and a designing method according to embodiments are described below with reference to FIGS. 6 to 12.

Figure 6:
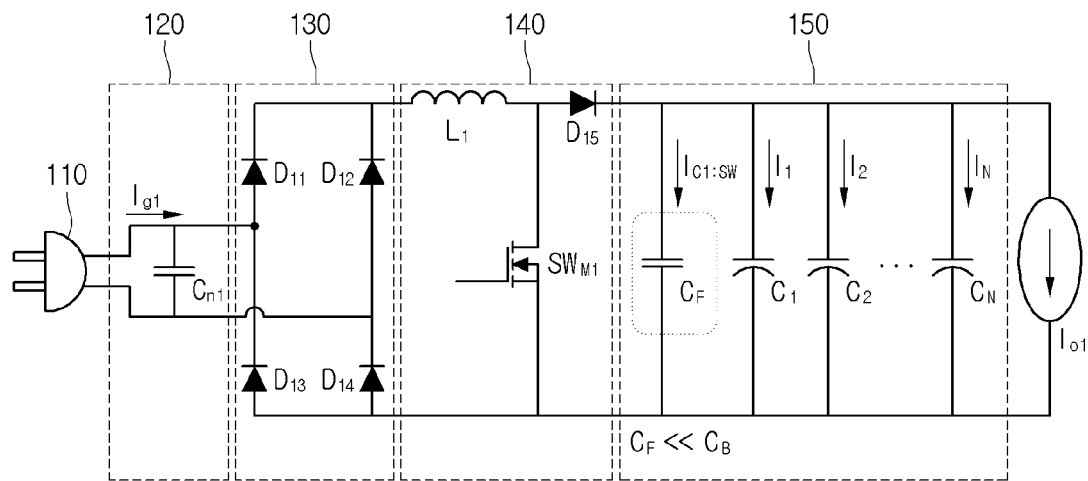
FIG. 6 is a circuit diagram of a power factor corrector according to another embodiment.

FIG. 6 is a circuit diagram of a power factor corrector according to another embodiment.

The circuit diagram of FIG. 6 is the same as that of FIG. 1 except for the smoothing unit 150. The smoothing unit 150 includes a film condenser $C_F$ and a plurality of electrolytic condensers $C_1$ to $C_N$. The film condenser $C_F$ is parallel-connected to the plurality of electrolytic condensers $C_1$ to $C_N$. In this case, the capacitance of the film condenser $C_F$ has a value significantly smaller than the equivalent capacitances of the electrolytic condensers.

As shown in FIG. 5, the frequency of the ripple current of the AC voltage is significantly small. Also, when the power factor correcting unit 140 is a boost converter, this frequency is significantly smaller than the frequency of a ripple current by the switching of the boost converter. Thus, the ripple current by the switching is smoothed by the parallel-connected film condenser $C_F$ and the ripple current by the AC voltage is smoothed by the parallel-connected electrolytic condensers $C_1$ to $C_N$. This is because the impedance characteristics of the electrolytic condensers $C_1$ to $C_N$ and the film condenser $C_F$ according to a frequency are different. Related descriptions are provided in detail with reference to FIG. 11.

Figure 7:
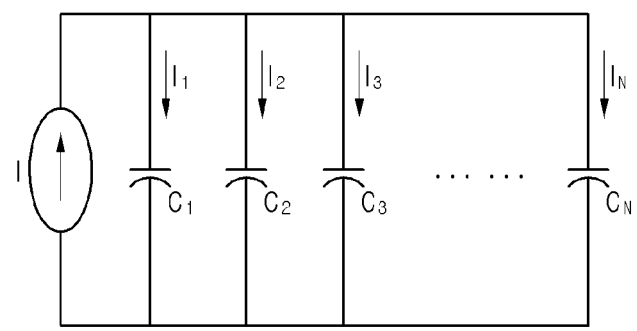
FIG. 7 is an equivalent circuit diagram of a smoothing unit according to another embodiment.

FIG. 7 is an equivalent circuit diagram of a smoothing unit according to another embodiment.

Current I represents the equivalent current of the total current input to the electrolytic condensers $C_1$ to $C_N$. Currents $I_1$ to $I_N$ represent currents flowing into the electrolytic condensers, respectively. The currents flowing through the electrolytic condensers $C_1$ to $C_N$ are determined according to impedance. Since there is a parallel connection, the current flows toward a side having low impedance according to a current division law. Impedance has a characteristic inversely proportional to a capacitance, and thus when the capacitances of the electrolytic condensers $C_1$ to $C_N$ are referred to as $C_1$ to $C_N$, the currents $I_1$ to $I_N$ satisfy the following relation:

When the plurality of electrolytic condensers $C_1$ to $C_N$ are parallel-connected in this method, there is an advantage in that it is possible to decrease the magnitude of a ripple current flowing into each of the electrolytic condensers. Also, when the electrolytic condensers are parallel-connected, an equivalent capacitance is the same as the sum of the capacitances of the parallel-connected electrolytic condensers. Thus, when considering that the price of one electrolytic condenser having a significantly large capacitance is more expensive than the total price of several condensers each having a small capacitance, it is possible to decrease a circuit design cost by replacing one electrolytic condenser with a plurality of parallel-connected electrolytic condensers. Also, since an electrolytic condenser having a large capacitance is also large in size, it is also possible to decrease the size of a circuit through such a design.

When the lifetime of the power factor corrector 100 is most important like a charger for a vehicle, ripple flowing through an electrolytic condenser is the most important factor that determines the lifetime of the power factor corrector, as mentioned above. Thus, a design should be made in consideration of the magnitude of a ripple current flowing through each of the parallel-connected electrolytic condensers.

There is a tolerance in the capacitance of a capacitor that is actually used. Thus, in order to design the smoothing unit 150 by parallel-connecting a plurality of electrolytic condensers, there is a need for a design method of calculating the magnitude of a ripple current in consideration of the tolerance and defining a limit ripple current that each of the electrolytic condensers has. Also, in order to ensure that the power factor corrector 100 has a certain lifetime, an example where a current flowing through any one of the electrolytic condensers $C_1$ to $C_N$ has a maximum value is expected, and in this case, an electrolytic condenser $C_1$ to $C_N$ having a value larger than a ripple current as a limit ripple current should be used.

It is assumed that the tolerance of the capacitance of a capacitor is $\alpha(0<\alpha<1)$. It is assumed that the capacitances of the parallel-connected electrolytic condensers $C_1$ to $C_N$ are all the same, and refer to the value as C. A ripple current having the largest RMS value flows through any one of the electrolytic condensers $C_1$ to $C_N$ in the following case. That is, it is when one capacitor has a tolerance of $+\alpha$ and the capacitances of the other capacitors each have a tolerance of $-\alpha$. When considering such a situation, the relation above may be arranged as follows:

$$I_{K:Max} = \frac{C_{K:Max}}{C_1 + C_2 + C_3 \ldots + C_N} \times I = \frac{(1+\alpha)C}{(1+\alpha)C + (N-1)(1-\alpha)C} \times I =$$

$$\frac{(1+\alpha)}{1+\alpha+(N-1)(1-\alpha)} \times I = \frac{(1+\alpha)}{2\alpha + N(1-\alpha)} \times I$$

Since the tolerance of the capacitance of an electrolytic condenser is generally ±20%, it may be said that $\alpha=0.2$ and when this value is applied, the following result may be obtained:

$$I_{K:Max} = \frac{1.2}{0.8N + 0.4} \times I \Rightarrow I_{normal} = \frac{1.2}{0.8N + 0.4}$$

That is, when the smoothing unit 150 includes the film condenser $C_F$ and the plurality of parallel-connected electrolytic condensers $C_1$ to $C_N$ as in the embodiment of FIG. 6 in designing the power factor corrector 100, a circuit should be designed by using electrolytic condensers each having a ripple current equal to or greater than $I_{KMax}$ as a limit ripple current in order to ensure that each power factor corrector has a lifetime equal to or longer than a certain period.

Figure 8:
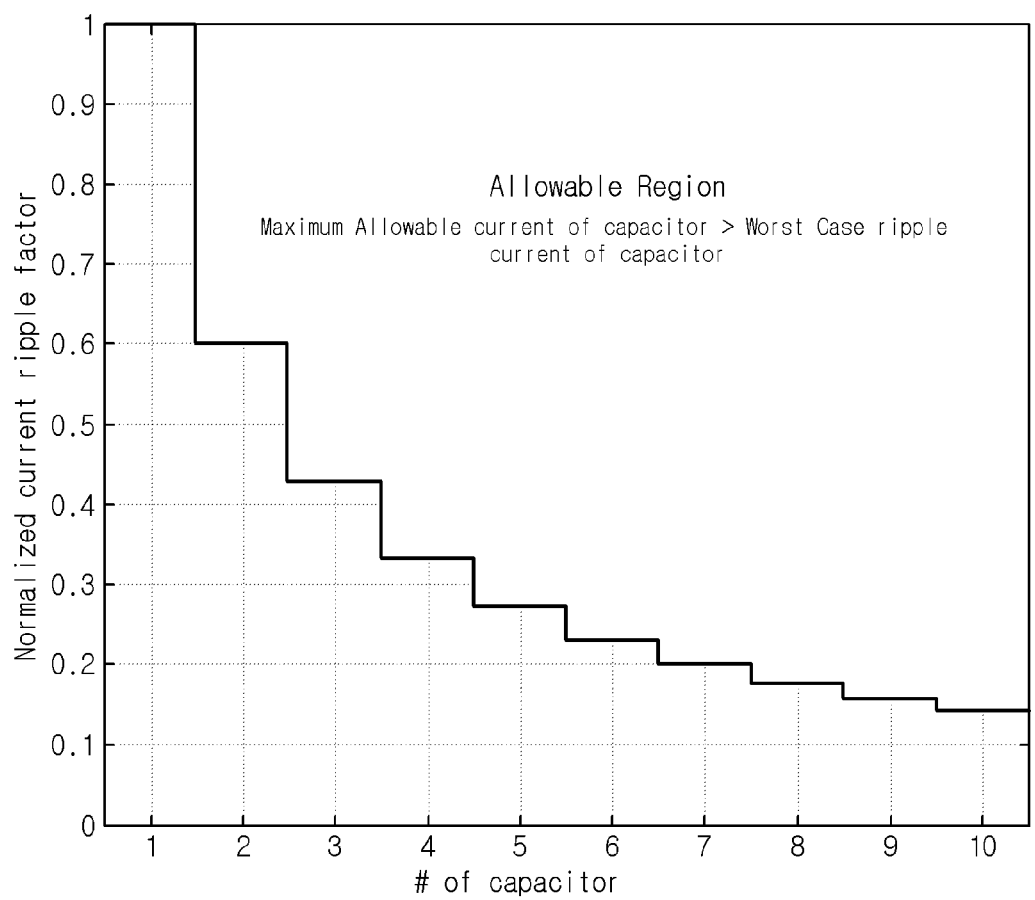
FIG. 8 is a graph of a ratio of ripple currents in an ideal case where there is no capacitance tolerance and a non-ideal case for the number of parallel-connected capacitors according to another embodiment.

FIG. 8 is a graph of a ratio of ripple currents in an ideal case where there is no capacitance tolerance and a non-ideal case for parallel-connected capacitors according to another embodiment.

In this case, it is assumed that the capacitance tolerance is 0.2 as in FIG. 7. From the graph of FIG. 7, it may be seen that due to the capacitance tolerance, when the number of condensers is two, a capacitor that may tolerate a ripple current equal to or greater than 0.6 times, not 0.5 times the total ripple current by an AC voltage input to electrolytic condensers should be used. As such, since there is a capacitance tolerance of electrolytic condensers $C_1$ to $C_N$, a ripple current greater than that in an ideal case that there is no capacitance error should be considered when designing the smoothing unit 150 of the power factor corrector 100 as in the embodiment of FIG. 5.

Figure 9:
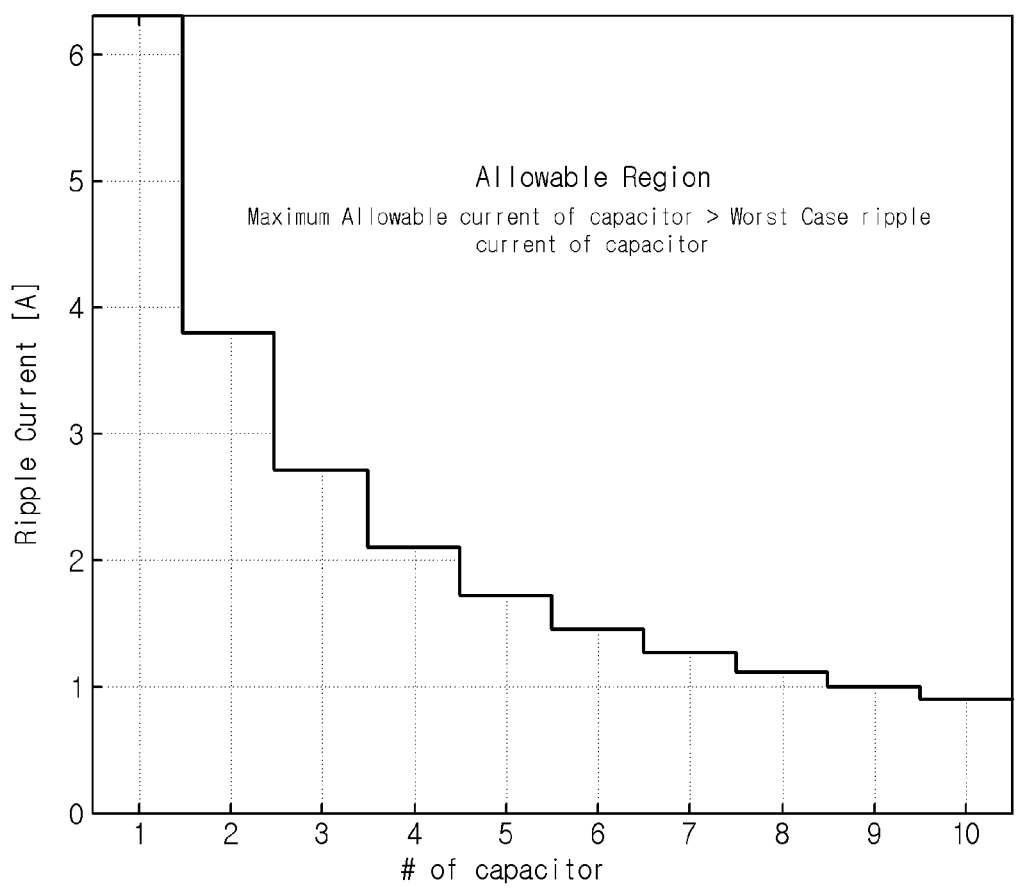
FIG. 9 is a graph showing the magnitude of a ripple current flowing in each capacitor for parallel-connected capacitors when the magnitude of the total input ripple current is 6.4 $A_{RMS}$ according to another embodiment.

FIG. 9 is a graph showing the magnitude of a ripple current flowing in each capacitor for parallel capacitors when the magnitude of the total input ripple current is 6.4 $A_{RMS}$ according to another embodiment. Since there is a capacitance tolerance of electrolytic condensers $C_1$ to $C_N$ as in FIG. 7, a ripple current greater than that in an ideal case should be considered when designing the smoothing unit 150 of the power factor corrector 100 as in the embodiment of FIG. 6. For example, when it is assumed that the number of the electrolytic condensers $C_1$ to $C_N$ is five, an electrolytic condenser that may tolerate a ripple current 137% greater than that in an ideal case should be used. That is, electrolytic condensers $C_1$ to $C_N$ that may tolerate a ripple current equal to or greater than (6.4)/5×1.37=1.75 $A_{RMS}$ should be used.

Figure 10:
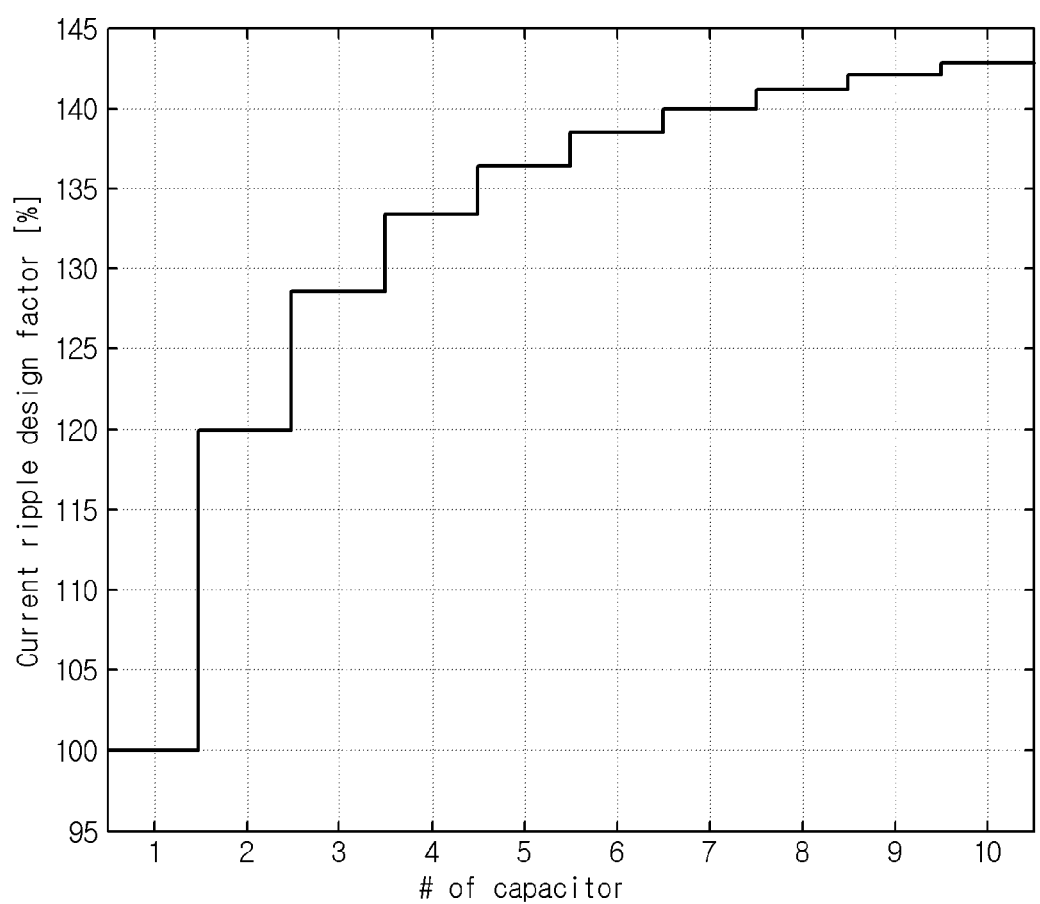
FIG. 10 is a graph of a ratio of the magnitude of a capacitor ripple current to be actually considered to an ideal situation where there is no capacitance tolerance when the capacitance is the same according to another embodiment.

FIG. 10 is a graph of a ratio of the magnitude of a capacitor ripple current to be actually considered to an ideal situation where there is no capacitance tolerance when the capacitance is the same according to another embodiment.

When it is assumed that the number of electrolytic condensers $C_1$ to $C_N$ is five, electrolytic condensers $C_1$ to $C_N$ should be selected in consideration of a ripple current 136% greater than 0.2 times, not grater than 0.2 times the total current I input to the electrolytic condensers $C_1$ to $C_N$.

Figure 11:
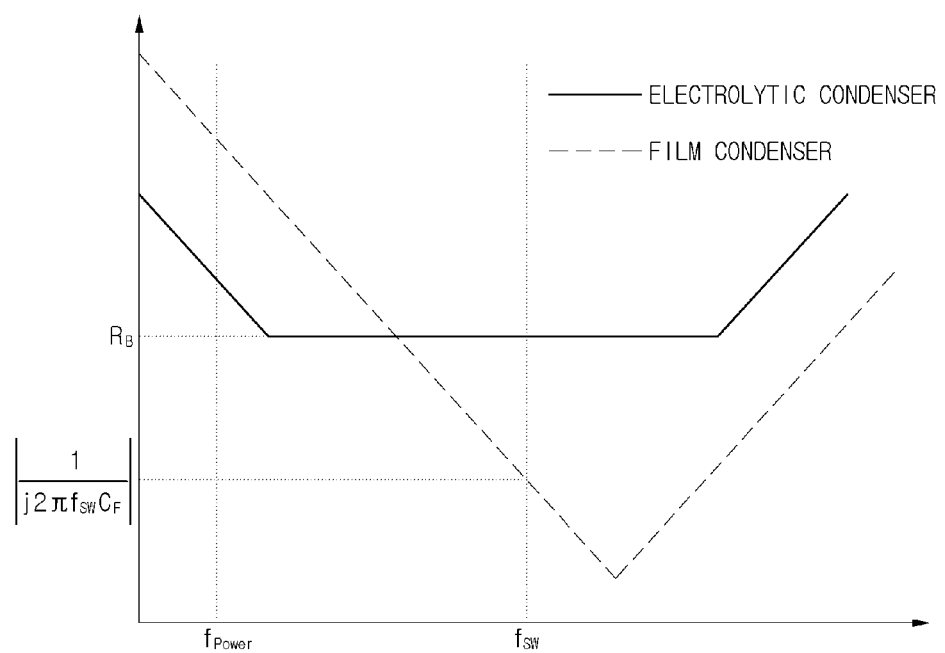
FIG. 11 is a graph of impedance characteristic vs. frequencies of an electrolytic condenser and a film condenser.

FIG. 11 is a graph of impedance vs. frequencies of an electrolytic condenser and a film condenser.

In the case of a frequency domain, a condenser has its characteristic at a low frequency, a characteristic similar to a resistance at an intermediate frequency, and a characteristic similar to an inductor at a high frequency. This is because a non-ideal condenser internally has a parasitic resistance and a parasitic inductance. On the graph, resistance $R_B$ means a parasitic resistance and frequency $f_{Power}$ means the frequency of a ripple current by an AC voltage, and frequency $f_{SW}$ means the frequency of a ripple current by the switching of a boost converter when the power factor corrector 140 is the boost converter.

Since electrolytic condensers $C_1$ to $C_N$ generally have large capacitances and large internal parasitic resistance components, they have relatively large impedance characteristics at the intermediate frequency, $f_{SW}$ as shown on the graph of FIG. 11. Since a film condenser has a small internal parasitic resistance, it has a relatively small impedance characteristic at the frequency $f_{SW}$. On the contrary, at a relatively low frequency, $f_{Power}$, the electrolytic condensers $C_1$ to $C_N$ have a relatively large impedance and the film condenser $C_F$ has a small impedance.

Thus, at the frequency $f_{Power}$, since the impedance of the electrolytic condensers $C_1$ to $C_N$ is relatively smaller than that of the film condenser $C_F$, a ripple current by an AC voltage flows toward the electrolytic condensers $C_1$ to $C_N$. At the frequency $f_{SW}$, since the impedance of the film condenser $C_F$ is relatively larger than that of the electrolytic condensers $C_1$ to $C_N$, a ripple current by switching flows toward the film condenser $C_F$.

Therefore, when the film condenser $C_F$ in addition to the electrolytic condensers $C_1$ to $C_N$ is parallel-connected in designing the smoothing unit 150, a ripple current by the switching of a boost converter is removed by the film condenser $C_F$. Thus, a ripple current that the electrolytic condensers $C_1$ to $C_N$ have to smooth is limited to a ripple current by an AC voltage. Thus, the lifetime of the electrolytic condensers $C_1$ to $C_N$ is extended. Also, the equivalent capacitance of a required electrolytic condenser also decrease, so the capacitance magnitude and number of electrolytic condensers $C_1$ to $C_N$ also decrease.

Figure 12:
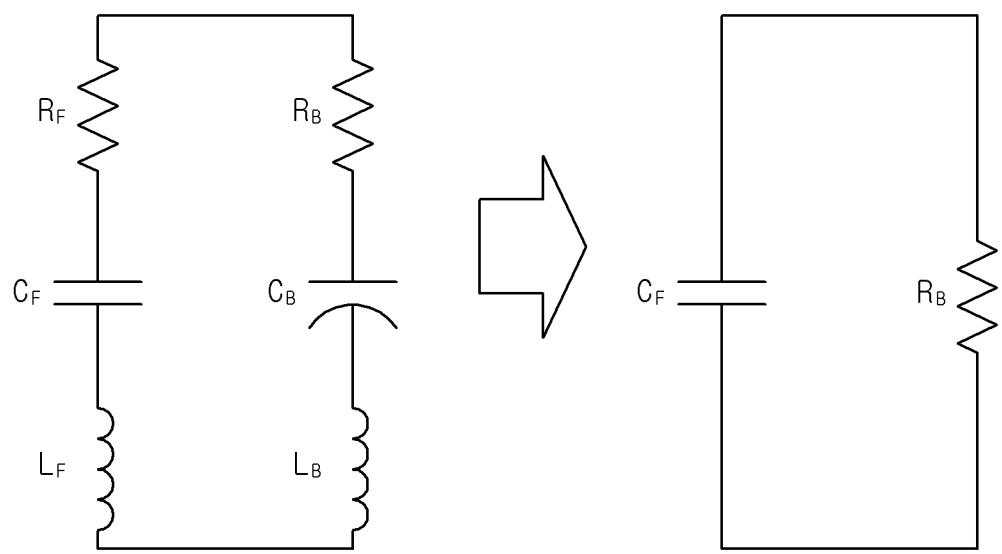
FIG. 12 is an equivalent circuit diagram in which a non-ideal film condenser having a parasitic resistance and a parasitic inductance and a non-ideal electrolytic condenser are parallel-connected.

FIG. 12 is an equivalent circuit diagram in which a non-ideal film condenser having a parasitic resistance and a parasitic inductance and a non-ideal electrolytic condenser are parallel-connected.

The non-ideal condenser internally has a parasitic resistance and a parasitic inductance. Thus, the parallel-connection between the electrolytic condenser and the film condenser of the smoothing unit 150 may be represented by a circuit diagram on the lefthand side of FIG. 11. Resistance $R_F$ represents the parasitic resistance of the film condenser, condenser $C_F$ represents the film condenser, inductance $L_F$ represents the parasitic inductance of the film condenser, resistance $R_B$ represents the parasitic resistance of the electrolytic condenser, condenser $C_B$ represents the electrolytic condenser, and inductor $L_B$ represents the parasitic inductor of the electrolytic condenser.

At an intermediate frequency, such as a frequency of a ripple current by the switching of a boost converter, a condenser shows a characteristic similar to a condenser resistance. In particular, in the case of the electrolytic condenser, such a characteristic is remarkable because a parasitic resistance is large, and in the case of the film condenser that has relatively small parasitic resistance and parasitic inductance, such a characteristic is not remarkable. Thus, at the frequency of a ripple current by the switching of a boost converter, a circuit in which the film condenser and the electrolytic condenser are parallel-connected may be considered as an equivalent circuit, such as a figure shown on the righthand side of FIG. 12.

Thus, in order for the total ripple current to flow to the film condenser at the frequency $f_{SW}$ of the ripple current by the switching of the boost converter, the following expression should be satisfied:

$$\left| \frac{1}{j2\pi f_{sw} C_F} \right| \ll R_B$$

In general, it is suitable that the ratio of two impedances is five to ten times.

The characteristics, structures, and effects described in the embodiments above are included in at least one embodiment but are not necessarily included only in one embodiment. Furthermore, the characteristic, structure, and effect presented in each embodiment may be combined or varied for other embodiments by a person skilled in the art. Thus, it would be construed that content related to such a combination and such a variation are included in the scope of the present invention.

Embodiments are mainly described above. However, they are just examples and do not limit the present invention. A person skilled in the art may appreciate that several variations and applications not presented above may be made without departing from the essential characteristic of embodiments. For example, each component specifically represented in embodiments may be varied. In addition, it should be construe that differences related to such a variation and such an application are included in the scope of the present invention defined in the following claims.

What is claimed is:

1. A power factor corrector correcting a power factor of an alternating current (AC) voltage, the power factor corrector comprising:
   a power factor correcting unit correcting a power factor of an AC voltage; and
   a smoothing unit smoothing a power factor corrected voltage, wherein the smoothing unit comprises a film condenser and a plurality of electrolytic condensers,
   wherein the plurality of electrolytic condensers have a same capacitance,
   wherein the plurality of electrolytic condensers are parallel-connected,
   wherein the plurality of electrolytic condensers have a limit ripple current that is determined based on a number of the plurality of electrolytic condensers.

2. The power factor corrector according to claim 1, wherein the plurality of electrolytic condensers have the limit ripple current that is further determined based on a capacitance tolerance of the plurality of electrolytic condensers.

3. The power factor corrector according to claim 1, wherein the power factor correcting unit is a boost converter that comprises a switch.

4. The power factor corrector according to claim 3, wherein a capacitance of the film condenser is determined by a switching frequency of the switch.

5. The power factor corrector according to claim 4, wherein a capacitance of the film condenser is determined by a value of a parasitic resistance of the plurality of electrolytic condensers.

6. A power factor corrector correcting a power factor of an AC voltage, the power factor corrector comprising:
   an inductor to one end of which a rectified voltage is applied;
   a switch, wherein one end of the switch is connected to the other end of the inductor, and the other end of the switch is earthed;
   a diode, wherein one end of the diode is connected to one end of the switch;
   a film condenser, wherein one end of the film condenser is connected to the other end of the diode, and the other end of the film condenser is earthed; and
   a plurality of electrolytic condensers parallel-connected to the film condenser,
   wherein the plurality of electrolytic condensers have a same capacitance,
   wherein the plurality of electrolytic condensers have a limit ripple current that is determined based on a number of the plurality of electrolytic condensers.

7. The power factor corrector according to claim 6, wherein the plurality of electrolytic condensers have the limit ripple current that is further determined based on a capacitance tolerance of the plurality of electrolytic condensers.

8. The power factor corrector according to claim 7, wherein a capacitance of the film condenser is determined by a value of a parasitic resistance of the plurality of electrolytic condensers.

9. A method of operating a power factor corrector correcting a power factor of an AC voltage, the method comprising:
   correcting a power factor of an AC voltage; and
   smoothing a power factor corrected voltage by using a film condenser and a plurality of electrolytic condensers,
   wherein the plurality of electrolytic condensers have a same capacitance,
   wherein the plurality of electrolytic condensers have a limit ripple current that is determined based on a number of the plurality of electrolytic condensers.

10. The method according to claim 9, wherein the plurality of electrolytic condensers have the limit ripple current that is further determined based on a capacitance tolerance of the plurality of electrolytic condensers.

11. The method according to claim 9, wherein the correcting of the power factor of the AC voltage comprises correcting the power factor by using a boost converter that comprises a switch.

12. The method according to claim 11, wherein a capacitance of the film condenser is determined by a switching frequency of the switch.

13. The method according to claim 12, wherein a capacitance of the film condenser is determined by a value of a parasitic resistance of the plurality of electrolytic condensers.

* * * * *